United States Patent [19]
Lamb

[11] Patent Number: 5,834,872
[45] Date of Patent: Nov. 10, 1998

[54] ADJUSTABLE MAGNETIC COUPLER

[75] Inventor: Karl J. Lamb, Port Angeles, Wash.

[73] Assignee: Magna Force, Inc., Port Angeles, Wash.

[21] Appl. No.: 834,094

[22] Filed: Apr. 14, 1997

Related U.S. Application Data

[63] Continuation-in-part of Ser. No. 803,365, Feb. 20, 1997, which is a continuation-in-part of Ser. No. 546,066, Oct. 20, 1995, Pat. No. 5,668,424, which is a continuation of Ser. No. 237,031, May 3, 1994, Pat. No. 5,477,094, which is a continuation-in-part of Ser. No. 65,867, May 21, 1993, Pat. No. 5,477,093.

[51] Int. Cl.$^6$ ............................. H02K 49/00; H02K 5/16
[52] U.S. Cl. ............................. 310/103; 310/90; 310/92; 310/93; 310/105; 310/114
[58] Field of Search ............................. 310/73, 92, 93, 310/103, 105, 114

[56] References Cited

U.S. PATENT DOCUMENTS

| | | | |
|---|---|---|---|
| 3,579,003 | 5/1971 | Gray | 310/93 |
| 3,612,630 | 10/1971 | Rosensweig | 308/10 |
| 3,659,126 | 4/1972 | Whipker | 310/92 |
| 4,152,617 | 5/1979 | Janson | 310/103 |
| 4,163,914 | 8/1979 | Keyes | 310/103 |
| 4,571,528 | 2/1986 | McGee et al. | 318/138 |
| 4,826,150 | 5/1989 | Minoura | 272/73 |
| 5,650,679 | 7/1997 | Boggs, III et al. | 310/105 |

*Primary Examiner*—Thomas M. Dougherty
*Assistant Examiner*—Elvin G. Enad
*Attorney, Agent, or Firm*—Seed and Berry LLP

[57] ABSTRACT

An adjustable coupler has a group of magnet rotors separated by air gaps from a group of conductor rotors. The air gaps are adjusted by axial movement of one of the groups relative to the other to vary the slip of the coupler and achieve a constant load speed at various load torques.

10 Claims, 7 Drawing Sheets

ADJUSTABLE MAGNETIC COUPLER

CROSS-REFERENCES TO RELATED APPLICATION

This application is a continuation-in-part of my application Ser. No. 08/803,365, filed Feb. 20, 1997, which is a continuation-in-part of my application Ser. No. 08/546,066, filed Oct. 20, 1995, now U.S. Pat. No. 5,668,424, which is a continuation of U.S. Ser. No. 08/237,031, filed May 3, 1994 now U.S. Pat. No. 5,477,094, in turn a continuation-in-part of U.S. Ser. No. 08/065,867, filed May 21, 1995 now U.S. Pat. No. 5,477,093.

TECHNICAL FIELD

The present invention relates to permanent magnet couplers of the type having a magnet rotor on one shaft spaced by an air gap from a conductor rotor on another shaft, the conductor rotor having a ferrous-backed electroconductive element located opposite magnets presented by the magnet rotor. More particularly, the invention relates to adjustment of the air gap.

BACKGROUND OF THE INVENTION

Induction motors are used, for example, to drive fans, blowers, pumps and compressors. It has been recognized that when these motors are operated at full speed they normally have excess capacity as compared to the load requirements, and this excess capacity is compounded when the load is variable. It has also been recognized that if the output of the motors could be adjusted to provide only the needed power, a significant reduction of energy usage would result. Hence, variable speed drives (VSD's) have been developed in the form of electronic devices which match motor speed to that required for a given application. A typical VSD rectifies incoming AC voltage and current into DC, then inverts the DC back to AC at a different voltage and frequency. The output voltage and frequency is determined by the actual power needs and is set automatically by a control system or by an operator.

Heretofore, VSD's have generally been so expensive that they have not been used extensively for energy savings. It has been reported that VSD's require the availability of highly trained maintenance personnel and shorten motor life.

SUMMARY OF THE INVENTION

The present invention aims to provide a mechanical alternative to VSD's which is far more economical, will automatically maintain the speed of the load to a preset speed as the load requirements vary, and will not require modification of the electric motor or adjustment of the input voltage or frequency. A further object is to provide a permanent magnet coupling which will function in place of VSD's without overheating In my prior U.S. Pat. No. 5,477,094 there is shown a magnetic coupler in which a magnet rotor unit is straddled by two conductor rotors which are connected together to rotate as a conductor rotor unit on one shaft while the magnet rotor unit is mounted to rotate on a second shaft. The magnet rotor unit has a set of permanent magnets arranged with their opposite poles spaced by air gaps from ferrous-backed electroconductive rings mounted on respective of the conductor rotors. Rotation of one of the two shafts results in rotation of the other shaft by magnetic action without there being any direct mechanical connection between the shafts.

My prior patent also discloses the concept of having two magnet rotors rather than a single magnet rotor unit, with each magnet rotor having a respective set of permanent magnets spaced by an air gap from one of the electroconductive elements presented by the conductor rotors. The two magnet rotors are axially moveable relative to one another and are spring biased apart. By the present invention the magnet rotors are positively positioned relative to each other such as to vary their axial positions automatically at will from a remote control location to provide by air gap adjustment a variable torque from a constant speed motor to a variable torque load operating at a lower constantly maintained speed.

Instead of spring biasing the two magnet rotors as discussed above, in accordance with the present invention the positions of the magnet rotors are controlled from a stationary control mechanism which communicates with an adjusting mechanism operating on the magnet rotors to selectively move them toward one another to widen the air gaps or to move them further apart to narrow the air gaps. Gap adjustment varies the rotational slip between the magnet rotor units and the conductor rotor units for a given torque load and hence effects the speed of the load. For a given torque load the air gaps can be adjusted to provide the torque at a preset rotational speed differential below the speed of the motor. Assuming that the torque output of the motor at the established operating speed of the motor is adequate relative to the load, it has been found that since the power output of the motor adjusts automatically to the power requirement of the load there are substantial energy savings. Furthermore, by the present invention, the normal speed differential (slip) between the magnet rotors and conductor rotors does not result in overheating.

The adjusting means of the present invention may take, for example, a form in which one of the magnet rotors is moved axially as, for example, by a reversible servo motor, and the other magnet rotor is responsively caused to move axially a like amount response to a mechanism operating between the magnet rotors. This mechanism may include a central rotor member mounted on the output shaft and having rocker arm units swing-mounted centrally on the rotor member and slide-mounted on the magnet rotors at the ends of the rocker arms so that the magnet rotors move equally in opposite axial directions whenever one of the magnet rotors is moved axially. The magnet rotors may be slide-mounted on the output shaft, for example, or may be slide-mounted on pins projecting from the central rotor member in parallel relation to the output shaft.

DETAILED DESCRIPTION OF THE INVENTION

Referring to the drawings, coaxial input and output shafts 20–21 have mounted thereon a conductor rotor unit 22 and a pair of magnet rotors 24–25. The conductor rotor unit has two axially spaced conductor rotors 26–27 having respective conductor rings 28–29 facing toward one another and formed from a non-ferrous material with high electrical conductivity such as copper. These conductor rings 28–29 are mounted as by bolts 30 on respective backing rings 32–33 which preferably are mild steel. The conductor rotor unit 22 also includes a rotor disc 34 mounted by bolts 35 on a hub 36 and spaced axially from the conductor rotor 27 by a ventilation gap 37. The conductor rotors 26–27 are connected together and to the disc 34 in axially spaced relation by sets of bolts 38–38' threaded into spacer sleeves 39–39' located outwardly of the orbits of the magnet rotors 24–25. Conductor rotor 26 is separated from the output shaft 21 by an annular clearance space 40. The hub 36 is mounted on input shaft 20 as by a wedge-type coupling 41 or a key connection.

Each of the magnet rotors 24–25 has a non-ferrous mounting disc 42 backed by a ferrous backing disc 43, preferably of mild steel. The mounting discs 42 may be aluminum or a suitable non-magnetic composite, and each is formed with a set of equally spaced rectangular cutouts 44 arranged in a circle and receiving a respective set of permanent magnets 46 seated against the respective backing disc 43. Adjacent magnets have their polarities reversed. The magnets 46 are spaced by air gaps 48–48' from the conductor rings 28–29 of the conductor rotor unit 22.

Preferably the disc 34 is formed with ventilation holes 49 communicating with the ventilation gap 37 to assist in the circulation of air through the air gap 48 for cooling the conductor ring 29. Cooling air for the conductor ring 28 is free to enter the air gap 48 from the clearance space 40. It is preferred to have the magnets 46 project part way from the mounting discs 42 to increase the space for air flow past the conductor rings 28–29 and to cause turbulence of the circulating air. It is to be understood that providing added ventilation for cooling of the conductor ring 29 by way of the ventilation space 37 and/or ventilation holes 49 may not be required for all applications in which case the backing ring would be mounted on the disc 34, as shown in FIG. 9, or the conductor ring 29 could be mounted directly on the disc 34 which thereupon could serve as the ferrous backing for the conductor ring 29 rather than the backing ring 30.

In accordance with the present invention the magnet rotors 24–25 are mounted so as to rotate in unison with the output shaft 21 and also be axially moveable relative to one another in opposite axial directions for adjustment of the air gaps 48–48'. To this end the output shaft 21 is splined and the magnet rotors 24–25 are mounted on the splines by way of linear ball bearing units 50 of the type having ball bearings circulating in the valleys between the splines.

Push-pull means is provide to move the magnet rotors in unison along the splined output shaft 21 in opposite directions to vary the width of the air gaps 48–48'. The push-pull means may comprise a first mechanism extending through the clearance spacer 40 for axially moving the magnet rotor 24, and a second mechanism extending between the magnet rotors for moving the magnet rotor 25 responsive to movement at the magnet rotor 24 by the first mechanism. The second mechanism includes a fifth rotor 52 which has spoke arms 53 and is fixed to the output shaft 21 so as to be midway between the conductor rotors 26–27. The spoke arms 53 are formed with threaded radial bores extending toward the shaft 21 from their outer ends to receive shoulder bolts 55 on which needle bearings 56 are sleeved. These bearings receive center hubs 57a of rocker units 57 having a pair of rocker arms 57b with cross-pins 58 projecting laterally adjacent their outer ends. Journal-mounted on each of the cross-pins 58 at opposite sides of the respective rocker arm are a pair of rollers 59–59' which are confined by linear track units 60 mounted on the opposing inner faces of the backing members 43 on the magnet rotors. The track units 60 each have two complementing sections 60a–60b of a generally zee-shaped cross-section which are spaced laterally apart at their opposing inner edges for passage of a rocker arm 57b and confine the rollers 59–59' against separating from the magnet rotors during rocking of the rocker arm units 56, but permit the rollers 59–59' to roll along the back face of the magnet rotors on a line which, when extended, is perpendicular to a radius of the respective magnet rotor that corresponds in position on the magnet rotor to the position of the spoke arms 53 on the fifth rotor 52.

Figure 2:
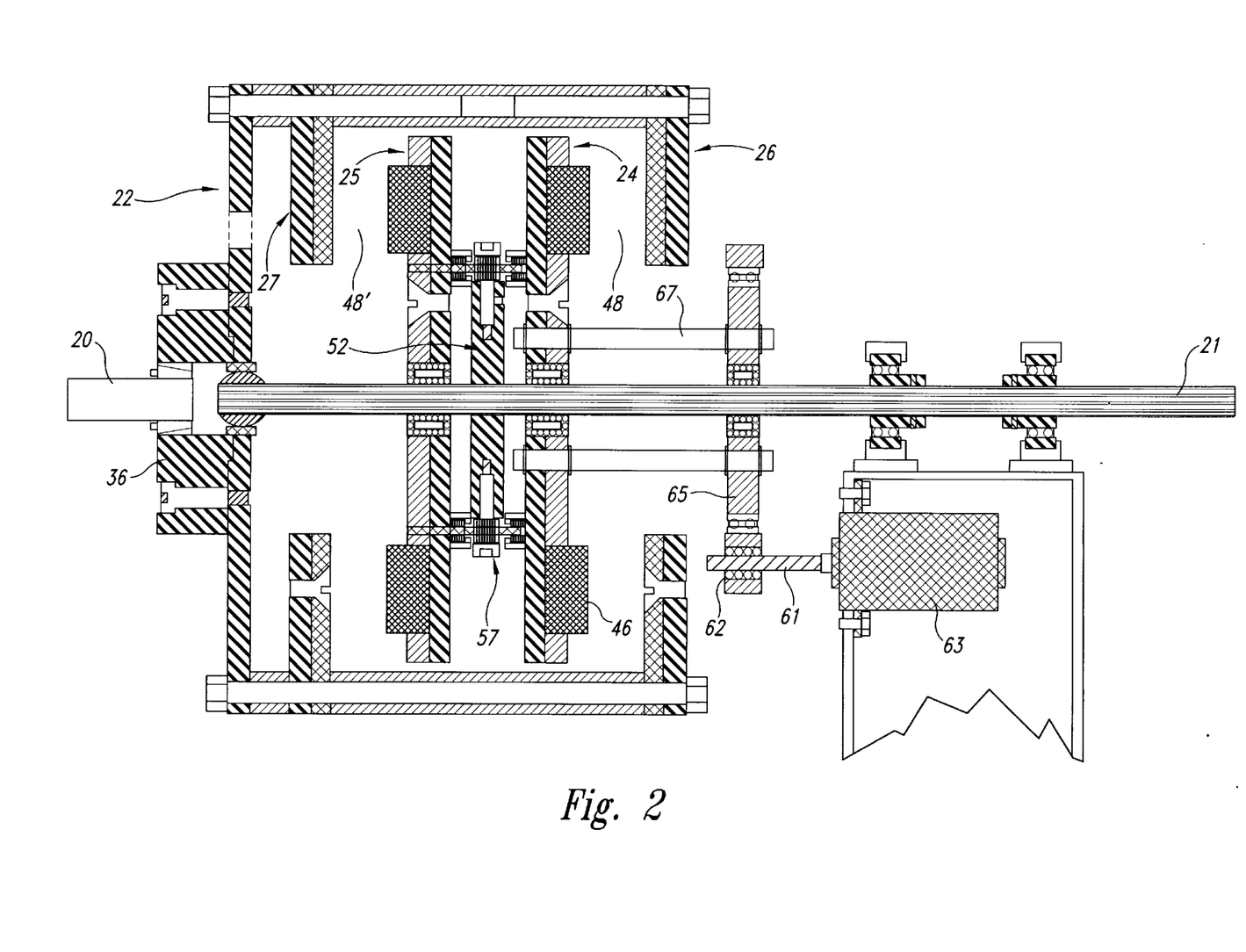
FIG. 2 shows the first embodiment in a wide air gap position.
Figure 3:
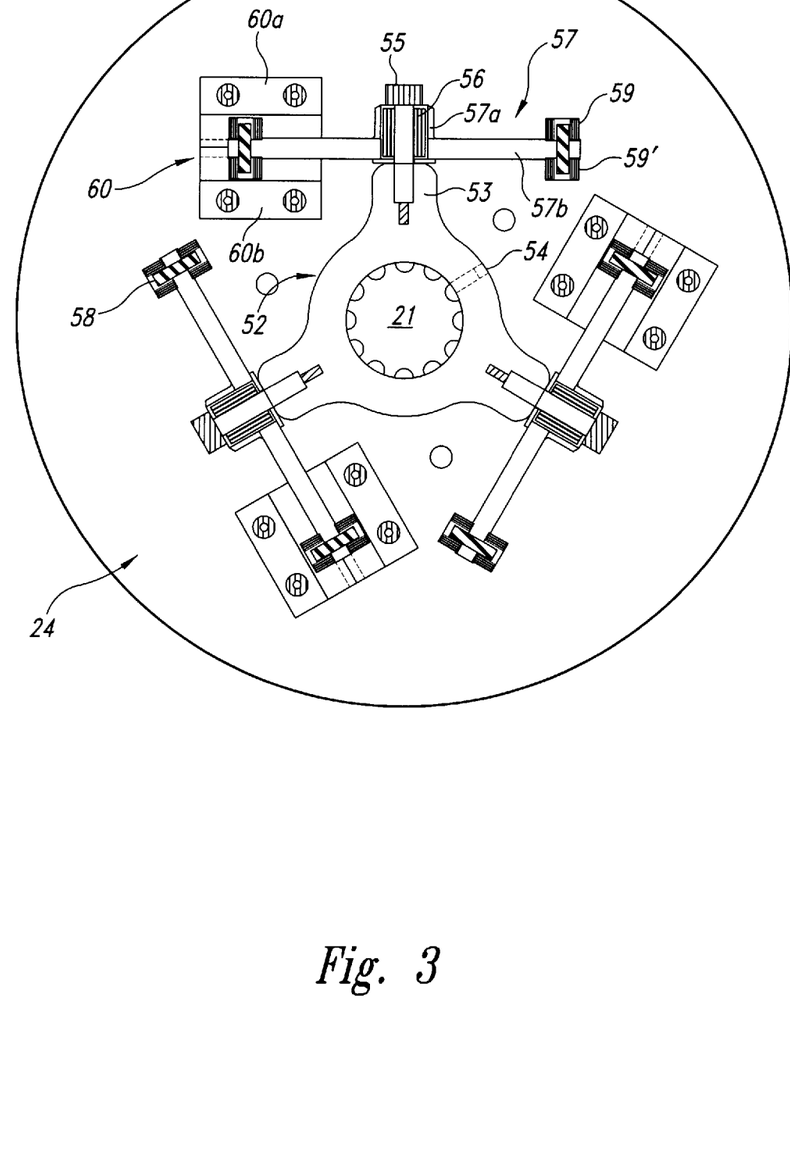
FIG. 3 is an elevational view showing the fifth rotor and related rocker arm units partly in section.

With the described rocker arm and track arrangement it is apparent that when the magnet rotor 24 is pushed away from the conductor rotor 26 to increase the width of the air gap 48, the rocket arms units 57 will responsively pivot on the bolts 55 so that their ends will swing toward the fifth rotor 52 as shown in FIG. 2. During this swinging movement the rollers 59–59' move linearly relative to the backing members 43 of the magnet rotors 24–25 and as a result the magnet rotor 25 is pulled toward the fifth rotor 52, thereby increasing the width of the air gap 48' to the same extent as the width of the air gap 48 is increased.

Figure 1:
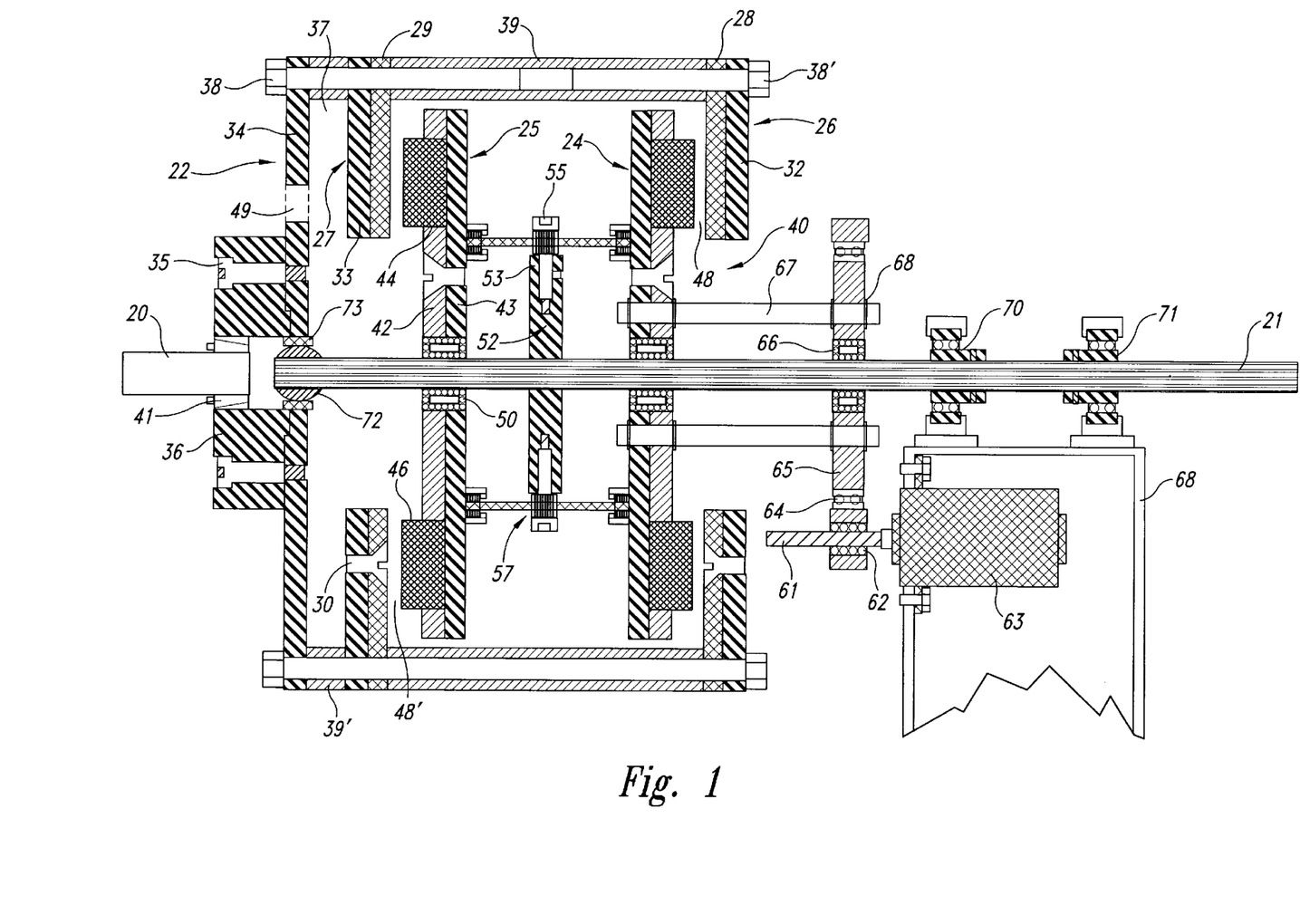
FIG. 1 is a longitudinal sectional view of a first embodiment of the invention shown in a narrow air gap position.

Likewise, when the magnet rotor 24 is pulled toward the conductor rotor 26 to narrow the width of the air gap 48, the rocker arm units 57 will responsively pivot on the bolts 55 so that their ends will swing away from the fifth rotor 52, thereby causing the magnet rotor 25 to be pushed toward the conductor rotor 27 and narrow the air gap 48' in correspondence with the narrowing of the air gap 48 as shown in FIG. 1.

Pushing and pulling of the magnet rotor 24 to vary the width of the air gaps 48–48' is preferably accomplished by using a stationary reversible servo motor 63 which has its output shaft 61 threaded to coact with a ball type nut 62 so that operation of the servo motor causes axial movement of the ball nut. The latter is mounted on the outer race of a thrust bearing 64 having its inner race mounted on the periphery of an axially moveable control rotor 65. This control rotor 65 is mounted on the splined output shaft 21 as by a ball spline nut 66 so that the control rotor rotates with the output shaft 21 and is free to move axially relative to the output shaft. Three equally spaced push-pull rods 67 extend through the clearance opening 40 and through registering axial openings in the control rotor 65 and magnet rotor 24. Pairs of C-rings 68 fit into annular grooves in the push-pull rods 67 on opposite sides of control rotor 65 and magnet rotor 24 to connect these rotors to the push-pull rods so that as the control rotor moves axially responsive to operation of the servo motor 60 this axial motion is transferred to the magnet rotor 24.

The servo motor 63 is preferably mounted on a pedestal 68 together with a pair of thrust bearings 70–71 for supporting the output shaft 21. Since the portion of the output shaft which cantilevers axially toward the input shaft 20 from the bearings 70–71 carries the load of the magnet rotors 24–25 and the related adjustment mechanism, it is preferred to provide the cantilevering end of the output shaft with a ball 72 which fits within a bushing 73 press-fitted into the center bore of the disc 34 and hub 36 of the conductor unit 22. This arrangement permits misalignment between the shafts 20–21 while lending support to the output shaft 21 from the bearings (not shown) supporting the input shaft 20. For balance, a second servo motor and related drive connection to the control rotor 65 may be provided on the opposite side of the control rotor from the servo motor 63.

The servo motor 63 may be electrically connected to a controller having the rotational speed of the output shaft 20 as an input. The controller is set for a desired output speed and causes the servo motor to operate in a direction and degree of rotation such as to maintain the set speed by adjustment of the air gaps 48–48'. When the width of the air gaps is increased the slip between the magnet rotors 26–27 and conductor rotor unit 22 is increased, thereby lowering the speed of the output shaft. Narrowing of the air gaps decreases the slip, thereby increasing the speed of the output shaft.

Referring to FIG. 4–7 there is shown an alternative slide mounting arrangement for modified magnet rotors 24'–25' in which the magnet rotors are slide-mounted on pins 100 which project as stub shafts from a modified fifth rotor 52' in parallel relation to the output shaft. This alternative eliminates the linear ball bearing units 50 and the need to spline the output shaft 21. Also, the modified output shaft, designated 21', may be shorter than the splined shaft 21 and is not supported at its projecting end.

The modified fifth rotor 52' differs from the fifth rotor 52 by the addition of three spoke arms 98 between the spoke arms 53. Three equally spaced pins 100 are provided which are centrally press-fitted in openings 102 in the modified fifth rotor 52' and project through openings 104 extending through the magnet rotors 24'–25'. These openings 104 may be provided with bushings 105 or other suitable slide bearings. The pins 100 are of a length to fully support the magnet rotors 24–25 when the air gaps 48, 48' are at a minimum (FIG. 4).

Figure 4:
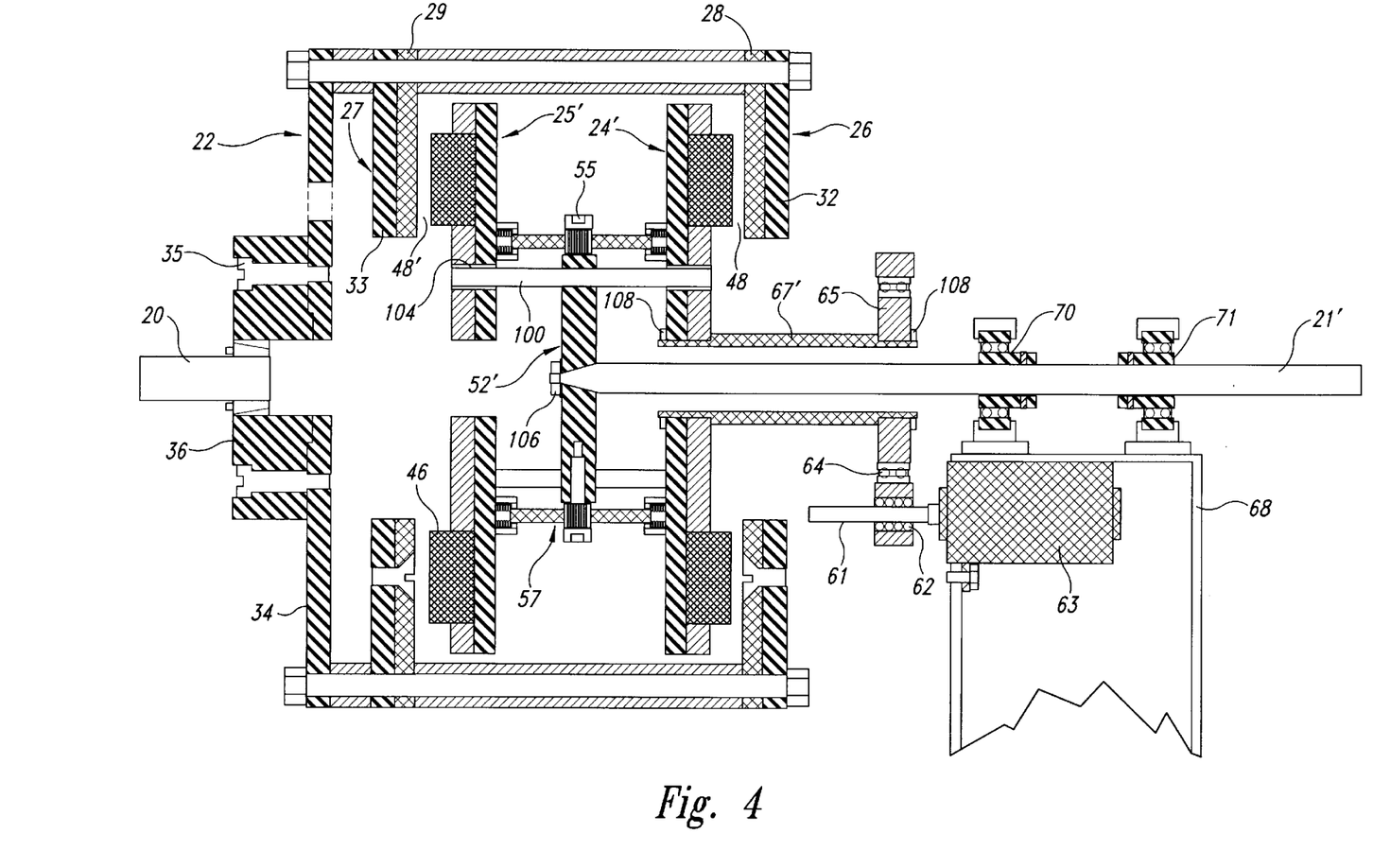
FIG. 4 is a longitudinal sectional view of a second embodiment of the invention shown in narrow air gap position.
Figure 5:
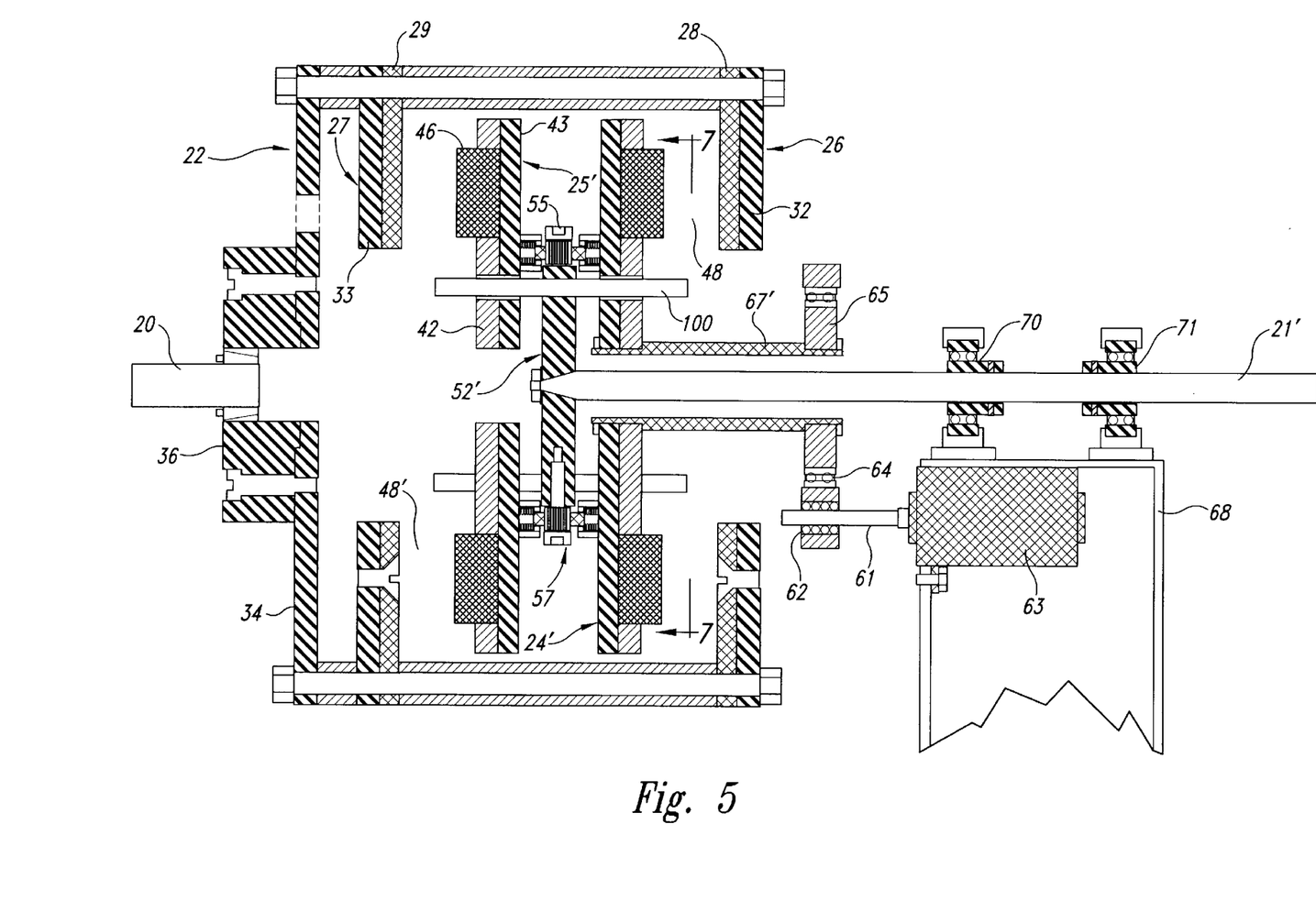
FIG. 5 shows the second embodiment in a wide air gap position.
Figure 6:
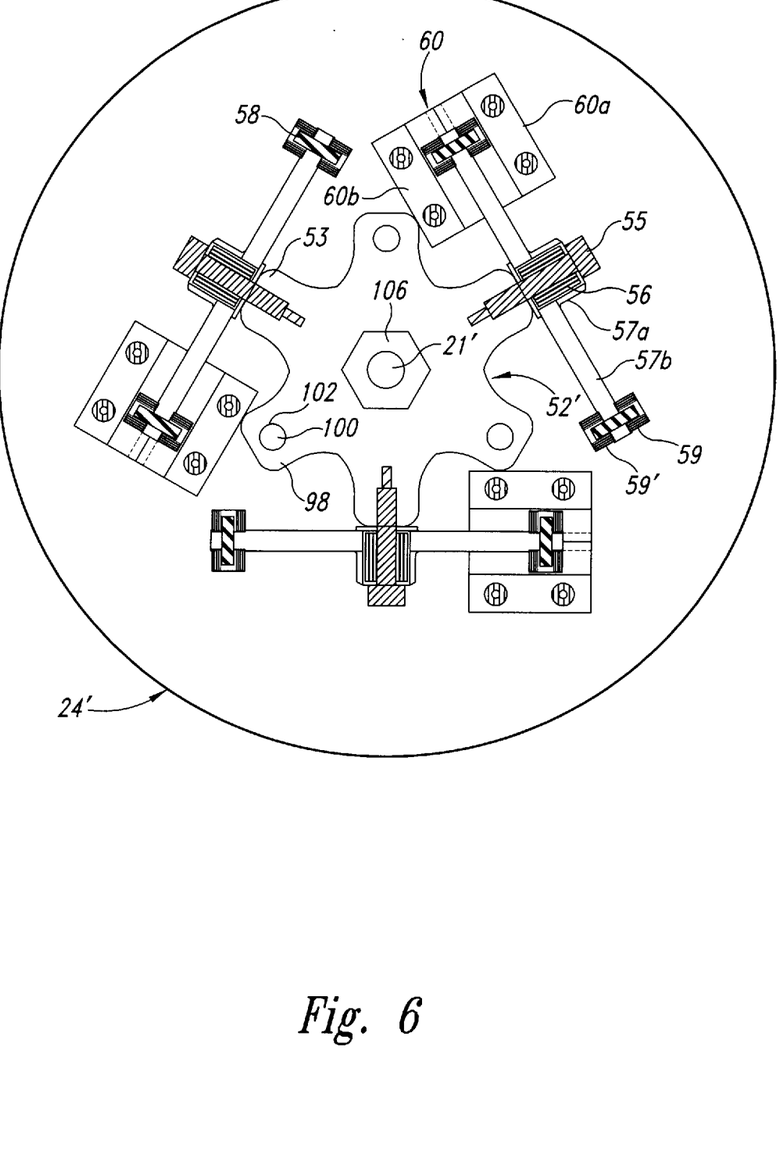
FIG. 6 is an elevational view corresponding to FIG. 3 showing a modified fifth rotor used in the second embodiment.
Figure 7:
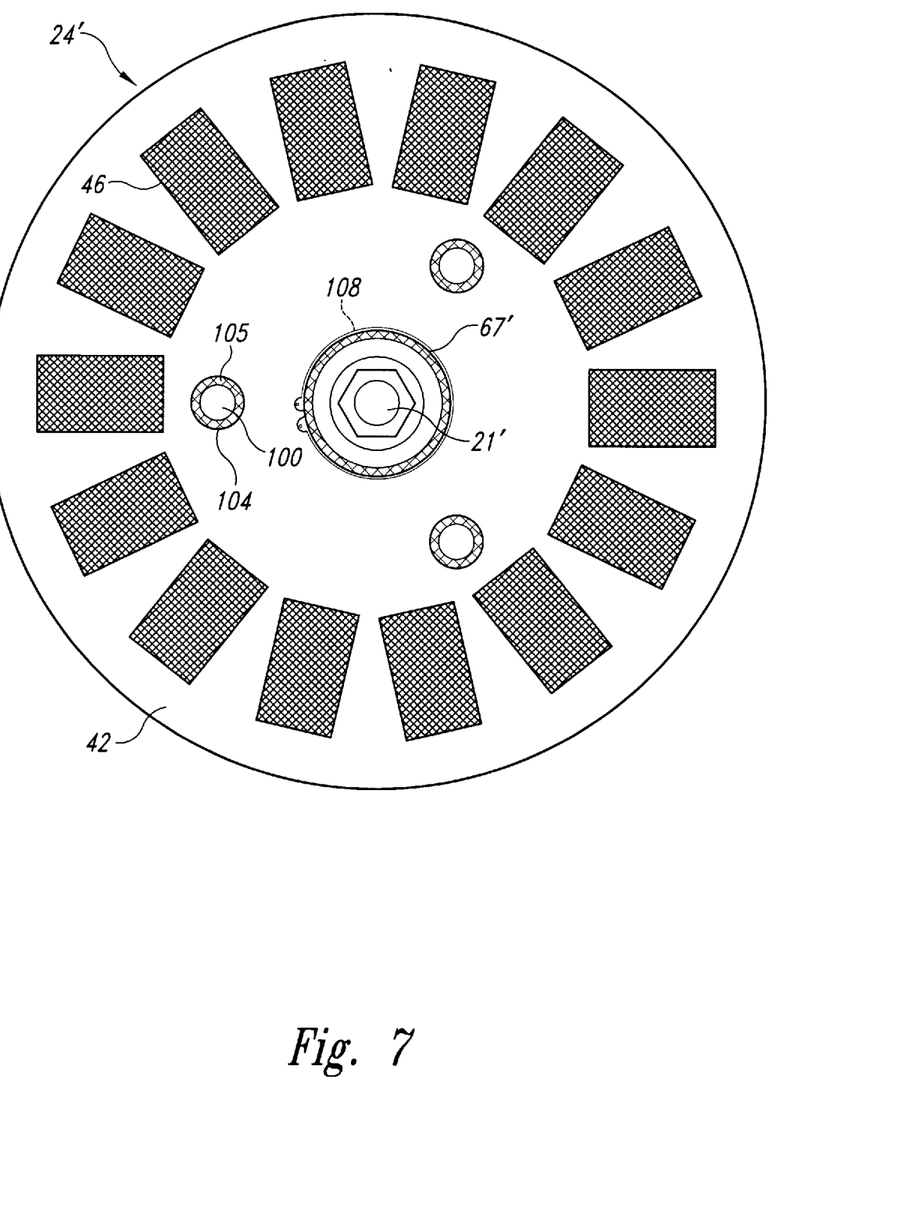
FIG. 7 is a transverse sectional view taken as indicated by line 7—7 in FIG. 5.

As shown in FIG. 4, the output shaft 21' may have a tapered interfit with a modified fifth rotor 52' and has a threaded end portion receiving a nut 106 to fix the fifth rotor on the shaft 21'. Rather than providing the three push-pull rods 67, a single push-pull element may be used in the form of a tube 67' which has necked end portion fitting into enlarged central openings through the magnet rotor 24' and the control rotor 65 and surround the output shaft 21' in space relating thereto. This modified arrangement eliminates any need for the spline nut 66. C-rings 108 snap-fitting into annular grooves adjacent the ends of the tube 67; may be used to hold the tube 67' fixed in position relative to the magnet rotor 24' and control rotor 65.

With the described modified arrangement utilizing the pins 100, it will be apparent that operation of the reversible servo motor 63 results in endwise axial movement of the control rotor 65, push-pull tubular element 67', and magnet rotor 24'. As before, endwise movement of the magnet rotor 24' results in equal and opposite endwise motion of the other magnet rotor 25' by way of operation of the rocker arm units 57. However, during this adjustment of the air gaps 48, 48' the magnet rotors 24'–25' slide on the respective end portions of the pins 100 rather than on the output shaft.

It will be appreciated that as an alternative to the servo motor 63, the push-pull element 67' may be positioned by a suitable pneumatic system or other arrangement providing remote control as described in my copending application.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An adjustable magnetic coupler comprising:
   first and second rotary shafts having a rotary axis;
   a group of two axially-spaced magnet rotors each containing a respective set of magnets;
   a group of two axially-spaced conductor rotors each having a nonferrous electroconductive ring spaced by an air gap from a respective one of said sets of magnets;
   the distance between the rotors of a first one of said groups being fixed, and such group being mounted on said first shaft to rotate in unison therewith;
   the rotors of the second one of the said groups being in concentric relation to said second shaft to be moveable axially relative to one another along said second shaft and to rotate together in unison therewith;
   a fifth rotor fixed to said second shaft at a location between the rotors of said second group of rotors; and
   a push-pull mechanism associated with said fifth rotor for axially moving a first rotor in said second group of rotors a selected distance in a selected axial direction and for axially moving the second rotor in said second group of rotors an amount equal to said selected distance, but in an axial direction opposite to said selected axial direction, whereby said air gaps are varied equally.

2. A coupler according to claim 1 in which said mechanism includes a rocker unit which is centrally swing-mounted on said fifth rotor and has its opposite ends slidable interfitting with the two rotors in said second group of rotors.

3. A coupler according to claim 1 in which said push-pull mechanism includes a stationary reversible motor with a rotary output shaft, a push-pull element connected to said first rotor in said second group, and a device for converting rotary motion of said motor to endwise motion of said push-pull element.

4. A coupler according to claim 1 in which said mechanism includes a non-rotating push-pull device, and includes a thrust bearing assembly having a non-rotary element connected to said push-pull device for selective axial movement and having a rotary element which is connected to said first rotor in said second group of rotors, whereby linear movement of said push-pull device is transferred to like linear movement of said first rotor in said second group of rotors.

5. A coupler according to claim 1 in which said second group of rotors is carried by said fifth rotor.

6. A coupler according to claim 1 in which said second group of rotors is slide-mounted on pins projecting from said fifth rotor.

7. An adjustable magnetic coupler comprising:
   first and second shafts having coaxial rotary axes;
   a group of two axially-spaced magnet rotors each containing a respective set of permanent magnets;
   a group of two axially-spaced conductor rotors each having a nonferrous electroconductive ring spaced by an air gap from a respective one of said sets of magnets;
   the distance between the rotors of one of said groups being fixed, and such group having a first of its rotors mounted on said first shaft to rotate in unison therewith, and having the second of its rotors surrounding said second shaft and radially spaced therefrom by a clearance space;

a support rotor fixed on said second shaft;

the rotors of the second of said groups being slidably carried by said support rotor at opposite sides thereof to be moveable axially relative to one another along the rotary axis of said second shaft and to rotate together in unison with said support rotor and second shaft;

and air gap adjustment means connected to the rotors of the second said group for selectively axially moving them relative to one another a selected distance, in opposite axial directions whereby said air gaps may be varied equally.

8. A coupler according to claim 7 in which said support rotor has pins projecting endwise thereof at opposite sides, and said rotors of the second of said groups are slide-mounted on said pins.

9. An adjustable magnetic coupler according to claim 8 in which the rotors of said one of said groups are conductor rotors each having its electroconductive ring engaged by a respective ferrous backing member; and in which the rotors of said second of said groups are magnet rotors, each having adjacent magnets of its set of permanent magnets arranged with their poles reversed, each said set being mounted in a respective carrier disc including a respective ferrous backing member engaged by the magnets of such set.

10. An adjustable magnetic coupler according to claim 7 in which said second mechanism includes rocker units each centrally pivotally mounted on said support rotor and slideably interfitting adjacent opposite ends with the rotors in said second group whereby axial movement of said first rotor in said second group is transferred in a reverse direction in like amount to said second rotor in said second group; and said rotors in said second group being slide-mounted on elements projecting from said support rotor between said rocker units.

\* \* \* \* \*